United States Patent

Török et al.

[11] 3,746,966
[45] July 17, 1973

[54] CURRENT CONVERTER CONTROL SYSTEM

[75] Inventors: Vilmos Török; Hans O. Skoog, both of Vasteras, Sweden

[73] Assignee: Allmanna Svenska Elektriska Aktiebolaget, Vasteras, Sweden

[22] Filed: Jan. 20, 1972

[21] Appl. No.: 219,394

[30] Foreign Application Priority Data
Feb. 2, 1971 Sweden.........................1227/71

[52] U.S. Cl...................... 321/5, 318/332, 321/38, 321/40
[51] Int. Cl. .......................................... H02m 1/08
[58] Field of Search ..................... 321/5, 18, 38, 40, 321/42; 318/332

[56] References Cited
UNITED STATES PATENTS

| | | | |
|---|---|---|---|
| 3,683,262 | 8/1972 | Neuffer et al......................... | 321/40 |
| 3,458,795 | 7/1969 | Ainsworth........................... | 321/38 X |
| 3,536,985 | 10/1970 | Ekstrom.............................. | 321/40 X |
| 3,551,778 | 12/1970 | Ekstrom.............................. | 321/38 X |
| 3,525,032 | 8/1970 | Torok.................................. | 321/38 X |
| 3,648,148 | 3/1972 | Bechet................................. | 321/40 X |

Primary Examiner—William H. Beha, Jr.
Attorney—Jennings Bailey, Jr.

[57] ABSTRACT

Disclosed herein is a current control system for a static converter. The converter has an inductive load object connected to its DC terminals and has a plurality of controllable rectifiers with a firing pulse generator connected to the rectifiers for supplying firing pulses thereto in a predetermined commutation sequence. The control system has a current sensing device for sensing the DC load current of the converter. A function generator computes, on the basis of this current, during each interval between consecutive firing pulses, a predicted load current value. This predicted value at each moment during one of said intervals corresponds to the load current, which is obtained during the next one of said intervals, if the next firing pulse in the commutation sequence is supplied at that moment. The predicted value is compared with a current reference value. When these two quantitites become equal the next firing pulse is supplied.

16 Claims, 8 Drawing Figures

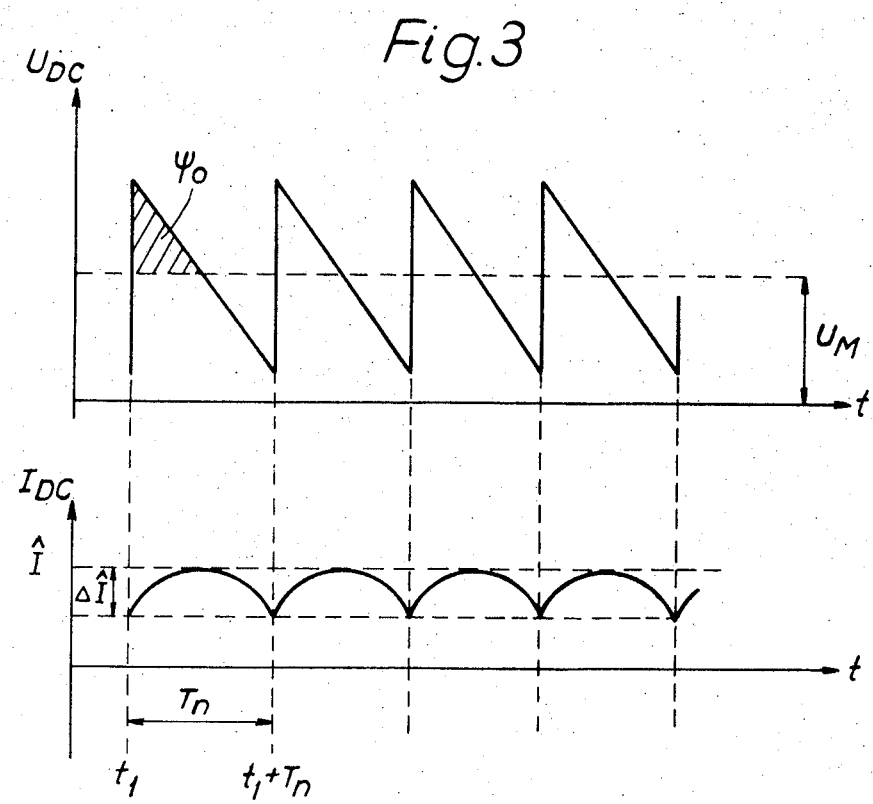

3,746,966

CURRENT CONVERTER CONTROL SYSTEM

BACKGROUND OF THE INVENTION

1. Field of the Invention

The present invention relates to a control system for a converter, in particular a converter that has an inductive load object connected to its DC-terminals. The load object need not be purely inductive, but its impedance can also comprise a smaller or larger resistive component. The load object can also be of the kind that generates a counter-electromotive force, such as a DC-motor.

The object of the invention is to obtain a closed current converter control system having a speed of control that materially exceeds the speed of control of previously known converter control systems.

2. The Prior Art

A very common converter connection is the three-phase-bridge connection (FIG. 1). It has six rectifiers (1–6), for instance thyristors, which during stationary conditions are fired in a pre-determined sequence (1–2–3–4–5–6) with an interval of 60 electrical degrees, which at an AC-frequency of 50 cycles/sec. corresponds to a time interval of 3.33 milliseconds between consecutive firing pulses. This time interval is called the commutation interval. By changing the control angle $\alpha$, that is, the phase displacement in relation to the AC-voltage of the firing pulses, the DC voltage of the converter may be varied and thereby the direct current of the converter. A sudden change of the control angle on an average gives a change in the DC voltage, and thereby in the DC current only one commutation interval later, that is, at 50 cycles per second 3.33 milliseconds. This limitation of the control speed is an inherent quality of this converter connection and may only be changed by selecting other converter connections with higher pulse numbers than six, that is, with more than six firing pulses per period of the alternating voltage.

In previously known systems for control of the DC current of a converter, the time constant of control is however substantially greater than the length of a commutation interval. This is due, for instance, to the fact that the measured direct current has to be filtered in order to eliminate the pulsations occuring in the current. For these reasons known systems usually have time constants of the order of 10 milliseconds or larger, resulting in the formation of very large current errors before these systems start to have any effect in diminishing these errors.

SUMMARY OF THE INVENTION

The present invention relates to a control system having a time constant, which lies at the lower limit mentioned above and is inherent to the converter connection. The time constant is in a typical case 3 to 10 times smaller than in prior systems.

According to the invention, a control system has a static converter which has an inductive load object connected to its DC terminals and is formed of a plurality of controllable rectifiers and pulse generators connected to the rectifiers for supplying firing pulses in a predetermined commutation sequence includes a current sensing device for sensing the DC load of the converter during each interval between two consecutive firing pulses, a function generator for generating during this time interval from the sensed DC current a quantity which corresponds to the DC current which would have been obtained during the following commutation interval assuming that the following firing pulse would have been supplied at the same moment and a device for comparing this quantity with a reference quantity and for controlling the firing pulse generator to emit the next following firing pulse when the generated quantity and the reference quantity are equal.

BRIEF DESCRIPTION OF THE DRAWING

The invention will now be more fully described in connection with the enclosed figures.

FIG. 3 shows direct current and direct voltage during stationary condition.

FIG. 2 shows a three-phase-bridge connected current converter SR with six rectifier valves, which comprise the thyristors 1–6. The AC-terminals of the bridge are connected to a three-phase AC line, R, S, T, with the frequency of 50 cycles per second. To the DC-terminals a load object, the DC-motor M, is connected. A control pulse means, SD, is connected to the thyristors and gives firing pulses to these thyristors in the sequence 1–2–3–4–5–6. Such control pulse means are previously well known and may, for instance, comprise a ring counter for distribution of the firing pulses to the thyristors in the correct sequence, and also means for making sure that a firing pulse is only given to a rectifier during a certain part, for instance 120°, of those 180 electrical degrees during which ignition is possible in the first approximation. Further the control pulse means usually comprises means for automatically giving a firing pulse to the rectifier a certain time before the latest time at which ignition is possible, provided that a firing pulse has not previously been given during that time interval when firing of the rectifier is possible.

Figure 1:
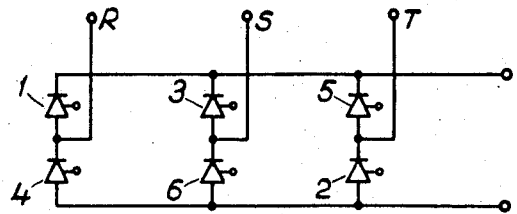
FIG. 1 shows a three-phase current converter of the type described above.

The control pulse means has an input, and when this input is provided with a signal $U_s$, the pulse means gives a firing pulse to that rectifier which is to be fired next. At the same time as the firing pulse the control pulse means gives a short pulse $U_p$ to the control system.

A three-phase current transformer T1 is connected into the AC-lines leading to the converter. The secondary current of this transformer is rectified in the diode bridge DB and thereafter it flows through the resistor R1. The voltage across this, $-I_{sv}$, is at each moment proportional to the direct current $I$ of the converter.

The primary winding of a transformer T2, whose core is provided with an air gap, is arranged to carry the direct current $I$. The secondary voltage $dI/dt$ of the transformer is proportional to the time derivative of the direct current, and this voltage is used to indicate when the direct current has its maximum value. The signal $dI/dt$ is carried to a NOR-gate N1 by a way of a level discriminator ND1. The other input of N1 is provided with a short pulse $U_p$ (for instance 0.1 ms) from the control pulse means SD at the same time as the start of a firing pulse. When both in-signals to N1 are zero, its output will be a one, and the pulse generator PG, for instance a monostable flip-flop will emit a short pulse (for instance 0.2 ms) to the relay RE which is then activated. For the sake of simplicity this relay is shown as an electromagnetical relay, but it may, of course, suitably be a static relay whose contact functions are obtained by means of switch transistors. The relay is activated as long as the pulse from PG lasts during which time the contact K1 is closed and K2 is open. The negative voltage $U_1$ is then added to $-I_{sv}$ at the input of amplifier F1 with scale factors which are dependent on the values of resistors R3 and R5. The output signal of the amplifier is positive because it has an inverted input, and because of the feed back resistor R2 it is proportional to the sum of $U_1$ and $I_{sv}$. When the relay is deactivated, K1 opens and K2 is closed. The amplifier now functions as a pure integrator with a feed-back capacitor C, and its output voltage $I_{pred}$ falls linearly with a time derivative which is constant and determined by $U_2$, $R_4$ and C. $I_{pred}$ is supplied to the inverted input of the comparator F2. The non-inverted input of F2 is supplied with a signal $I_{ref}$, the value of which is adjusted by means of the potentiometer R6. The output signal from F2 is zero if $I_{pred} > I_{ref}$ and one if $I_{pred} < I_{ref}$.

The output signal from ND1 and the signal $U_p$ are supplied to the inputs of the NOR-gate N2, whose output signal is zero, except when both input signals are zero. The output of N2 is delayed a time T, for instance 0.2 ms, in the delay circuit TF and is supplied to the one input of the AND-gate A, whose other input is supplied with the output from F2. If both inputs to A are one, an output signal $U_s$ is obtained from A, and is supplied to the control pulse means SD, which then immediately supplies a firing pulse to that rectifier which is in turn to be fired.

FIG. 3 shows the direct voltage $U_{DC}$ of the converter and also the direct current $I_{DC}$ as functions of time during stationary conditions and with the supposition that the load object has a zero resistance and a counter-electromotive force $U_M$. The falling parts of $U_{DC}$ are really parts of sine curves, but, at control angles not too much distant from 90°, they deviate fro straight lines in a relatively small degree, and in the figure they have been approximated with straight lines. The interval $T_n$ between two consecutive firing pulses is 60° in the converter of FIG. 2. The peak-to-peak value $\Delta I$ of the direct current is proportional to the hatched area in the figure and is determined by the equation $$\Delta \hat{I} = \frac{1}{L}\int_{t_1}^{t_1+\frac{T_n}{2}} (U_{DC} - U_m)dt = \frac{\psi o}{L}$$

where $L$ is the inductance of the load object.

During stationary conditions the integral of $U_{DC} - U_m$ over the time between two current maxima is zero, and therefore consecutive current maxima will lie at the same level $\hat{I}$.

Figure 4A:
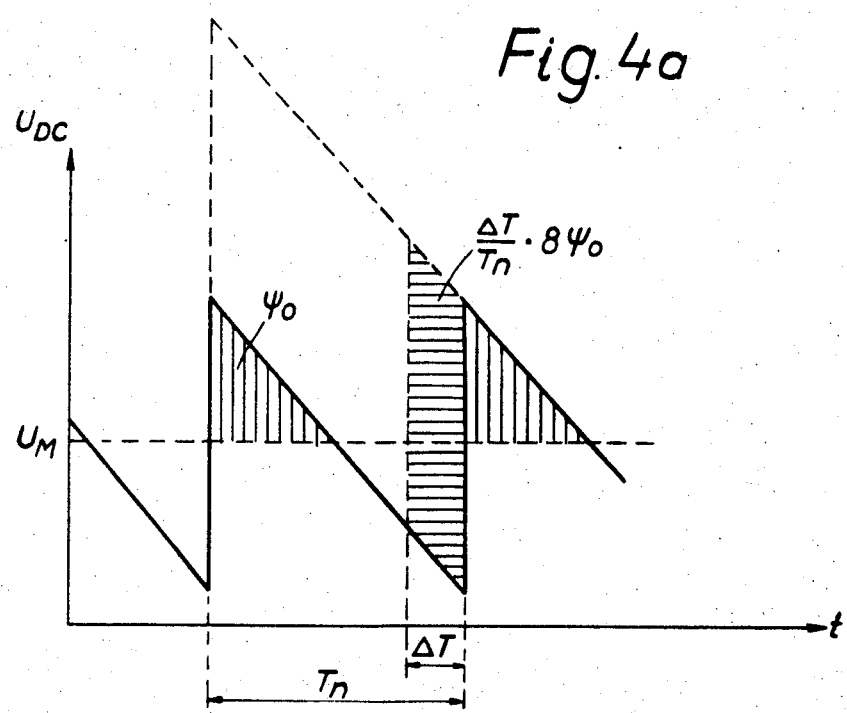
FIG. 4 shows how the prediction function is derived and also the approximate prediction function used in FIG. 2.

As shown in FIG. 4a, an advancement of a firing pulse by the time $\Delta T$ will mean an increase of said time integral by the amount $\Delta T/T_n \cdot 8 \psi o$. The current maximum coming after this advanced firing pulse will therefore exceed the previous current maximum by the amount $$\Delta I = 1/L \cdot \Delta T/T_n \cdot 8 \psi o = 8\Delta T/T_n \cdot \Delta \hat{I}$$

An advancement by $\Delta T = T_n$ will give $\Delta I = 8 \Delta \hat{I}$.

Figure 4B:
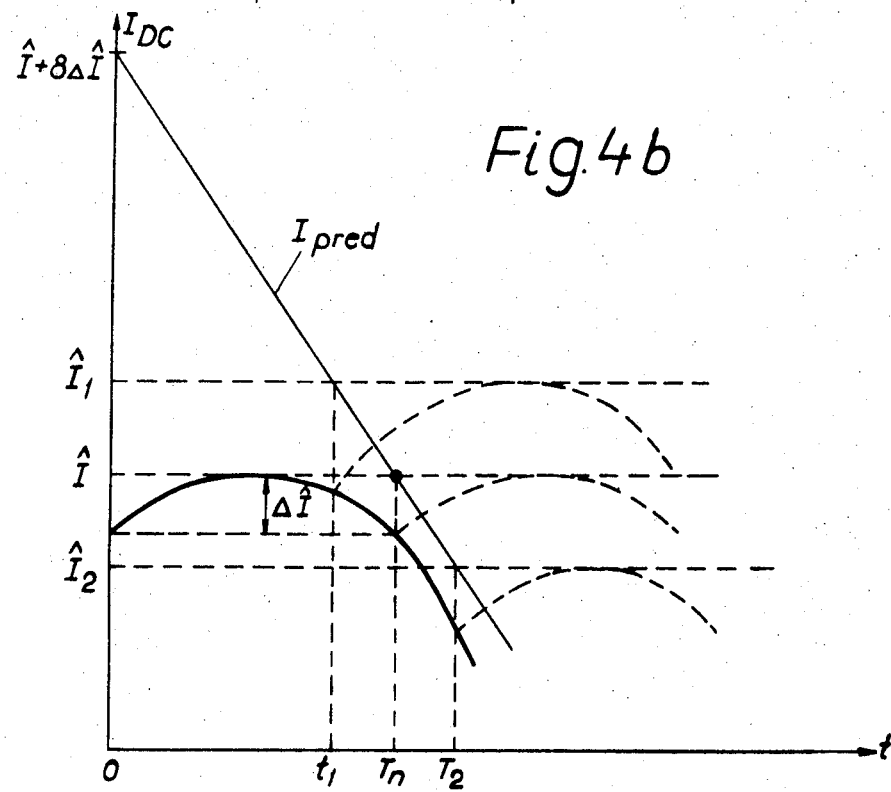

FIG. 4b shows this relation between the firing moment and the next current maximum. Under the simplified assumptions mentioned above, this function ($I_{pred}$) will be a straight line having the derivative $- 8 \Delta \hat{I}/T_n$ and going through the point $I_{DC} = \hat{I}$, $t = Tn$, where $\hat{I}$ is the current maximum during the present commutation interval. If a firing pulse is given at the time $t_1$, the next current maximum will have the value $\hat{I}_1$, and if it is given after time $t_2$, the current peak value $\hat{I}_2$ will be obtained, as shown in FIG. 4b.

According to the invention the prediction function $I_{pred}$ is compared to the reference value $I_{ref}$, which corresponds to the desired current peak value. When these two values are equal, a firing pulse is given. The next current peak will then automatically have a value corresponding to the reference under the assumption that the prediction function is exactly the correct one. The straight line shown in FIG. 4b is an approximation, which however closely corresponds to the correct curve, especially at firing angles which do not deviate too much from 90° and within the time interval in the neighbourhood of the time $T_n$ (FIG. 4b). In practice this approximation will give very good results.

The correct prediction function is a sine curve passing through the point $I_{DC} = \hat{I}$; $t=T_n$ and may be simply computed. When using a theoretically correct prediction function, the average time delay from the occurrence of a deviation between the reference value and the actual current value, and until this deviation has been reduced to zero will be equal to $T_n$, that is only 3.33 ms at a six pulse 50 cycles/sec. current converter. The system therefore is very fast.

If the prediction function deviates from its theoretically correct form, the current error will be reduced successively from one current peak to the next. Even if there are relatively large deviations of the prediction function, the current error will be reduced to a negligibly small value within a small number of commutation intervals.

Figure 2:
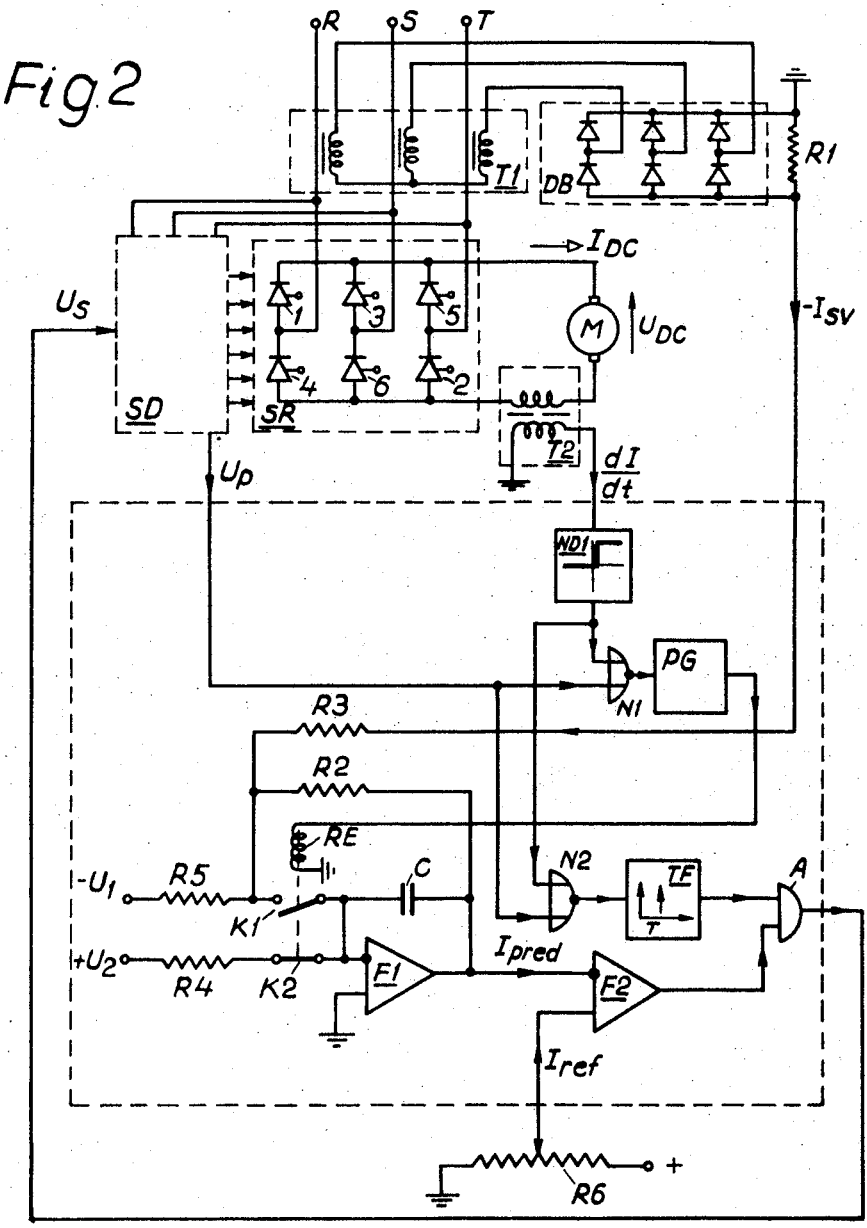
FIG. 2 shows a control system according to the invention.

In the system shown in FIG. 2 the prediction function is generated at the moment of the occurrence of the current peak ($t = Tn/2$ in FIG. 4 b). The magnitude 4 $\Delta \hat{I} + \Delta \hat{I}$ is supplied as the initial value to an integrator, whose output signal decreases with the time derivative $- 8 \Delta \hat{I}/T_n$ during the time up to the next current peak. Of course, the system may be refined in such a manner that a prediction function is generated also before the time of occurrence of the current peak. For instance, before the current peak, the function may be formed by the magnitude $I_{DC} + 4 \Delta \hat{I}$, and at the moment of the current peak pass over into and follow the straight line shown in FIG. 4b.

At the current peak $dI/dt$ becomes zero, ND1 in FIG. 2 changes its output signal from 1 to 0, N1 changes its output signal from 0 to 1, PG gives a short (0.2 ms) pulse to RE, which switches in $- U_1$ by way of R5 and $-I_{sv}$ by way of R3 to F1, the output signal of which then assumes a value corresponding to $\hat{I} + 4 \Delta \hat{I}$. RE is deactivated after 0.2 ms, and the output signal $I_{pred}$ of F1 decreases with the time derivative $- 8 \Delta \hat{I}/T_n$, which is determined by $U_2$, $R_4$ and C. When $I_{pred}$ equals $I_{ref}$, the output signal of F2 becomes positive and a one is supplied from F2 to A which supplies the signal $U_s$ to SPD, whereupon a firing pulse is supplied to that thyristor which is in turn to be fired (on the assumption that the second input of A is supplied with a one, which normally is the case).

Before the current peak N2 is supplied with a one from ND1, the output signal from N2 and TF is zero. At the current peak the signal from ND1 is changed to a zero, N2 gives a one, and after a time $T$, which is so long that the integrator has been able to assume its initial condition, for instance 0.2 ms, a one is supplied from TF to A. Only after this time a firing pulse can be given. Thereby undesired firing pulses are prevented, for instance during the time it takes for the integrator to assume its initial condition.

Should for any cause the current remain zero after a firing pulse, the integrator will immediately be caused to assume its initial conditions at the back of $U_p$ by way of N1, PG and RE. The prediction function in this case therefore starts to run directly after the firing pulse.

$U_1$ and $U_2$ in FIG. 2 may be obtained from a single voltage source. By changing the voltage of this, $U_1$ and $U_2$ will then be changed proportionally in equal amounts and the slope of the prediction function may thereby simply be adjusted in a suitable manner without causing the curve to deviate from the point $I_{DC} = \hat{I}$, $t = T_n$ (FIG. 4b).

If desired, the slope of the function may in this way be automatically controlled in dependence upon any desired quantity so that the desired control qualities are retained within the whole working interval of the system.

The system has turned out to give extremely good results with inductive load objects which have the time constant $L/R$, which substantially exceeds the length of the commutation interval.

This system thus gives a much increased speed of the current control system. This has the effect that other and following control loops may be made proportionally faster, which further accentuates the advantages of the system.

In the system described above, a prediction function is generated from the moment of occurrence of the maximum value of the load current between two commutations. This magnitude at each moment corresponds to the maximum value that the load current would reach after the next commutation, if this commutation was made at the moment in question. The prediction function is compared with the reference quantity, and a commutation is initiated when these two quantities are equal. In this system the greatest current change that may be obtained from one commutation interval to the next is $4 \cdot \Delta \hat{I}$, where $\Delta \hat{I}$ is the peak-to-peak value of the pulsation of the load current during stationary conditions.

A further embodiment of the invention will be described below. At this embodiment the said maximum current change becomes substantially larger, whereby a substantially greater control speed may be reached when controlling the load current.

Figure 5:
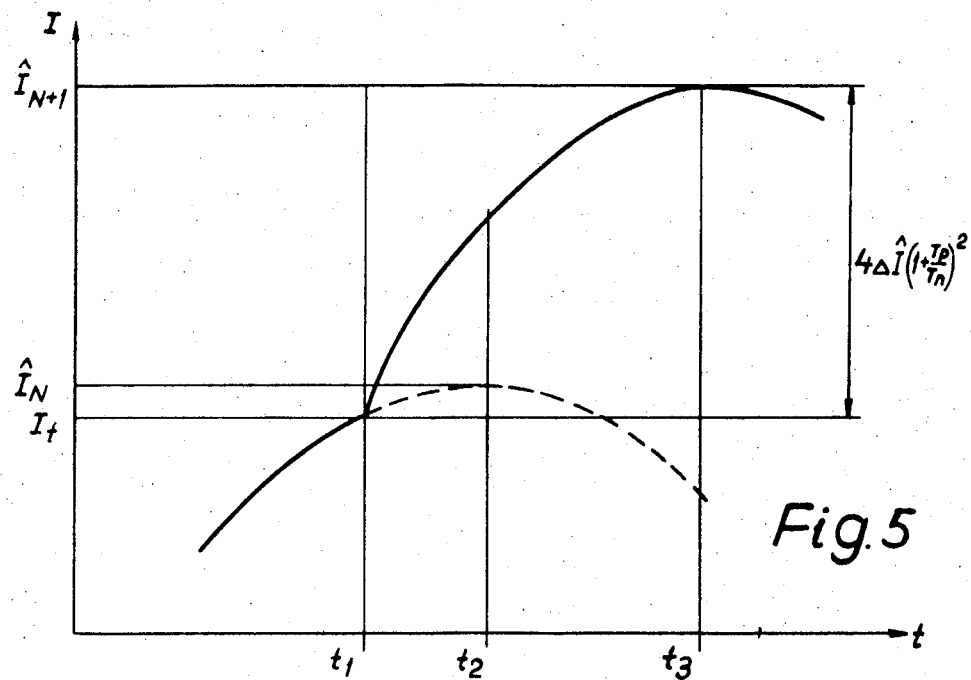
FIGS. 5–7 show a further variation of the invention and its function.
Figure 6:
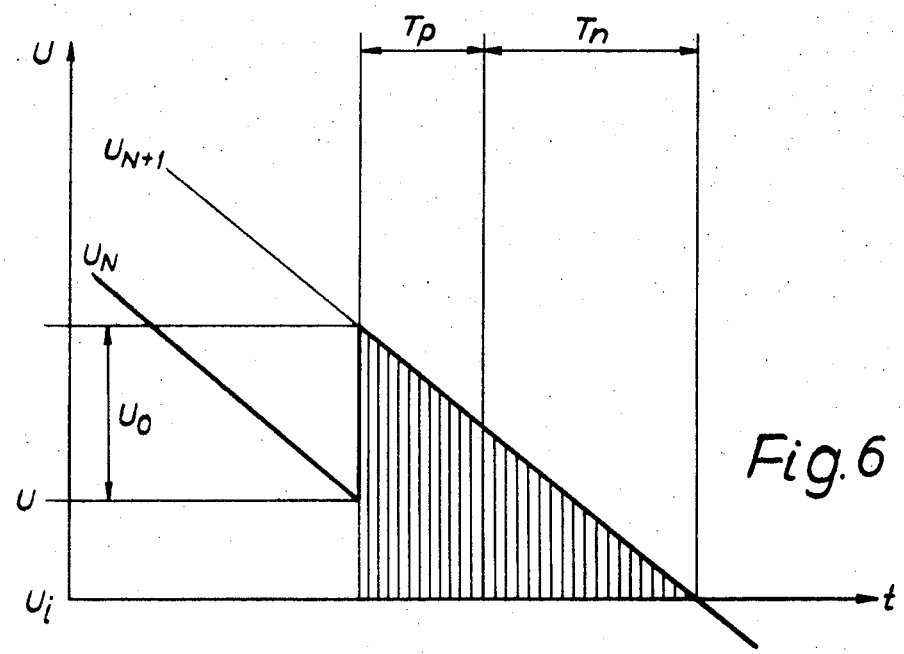
Figure 7:
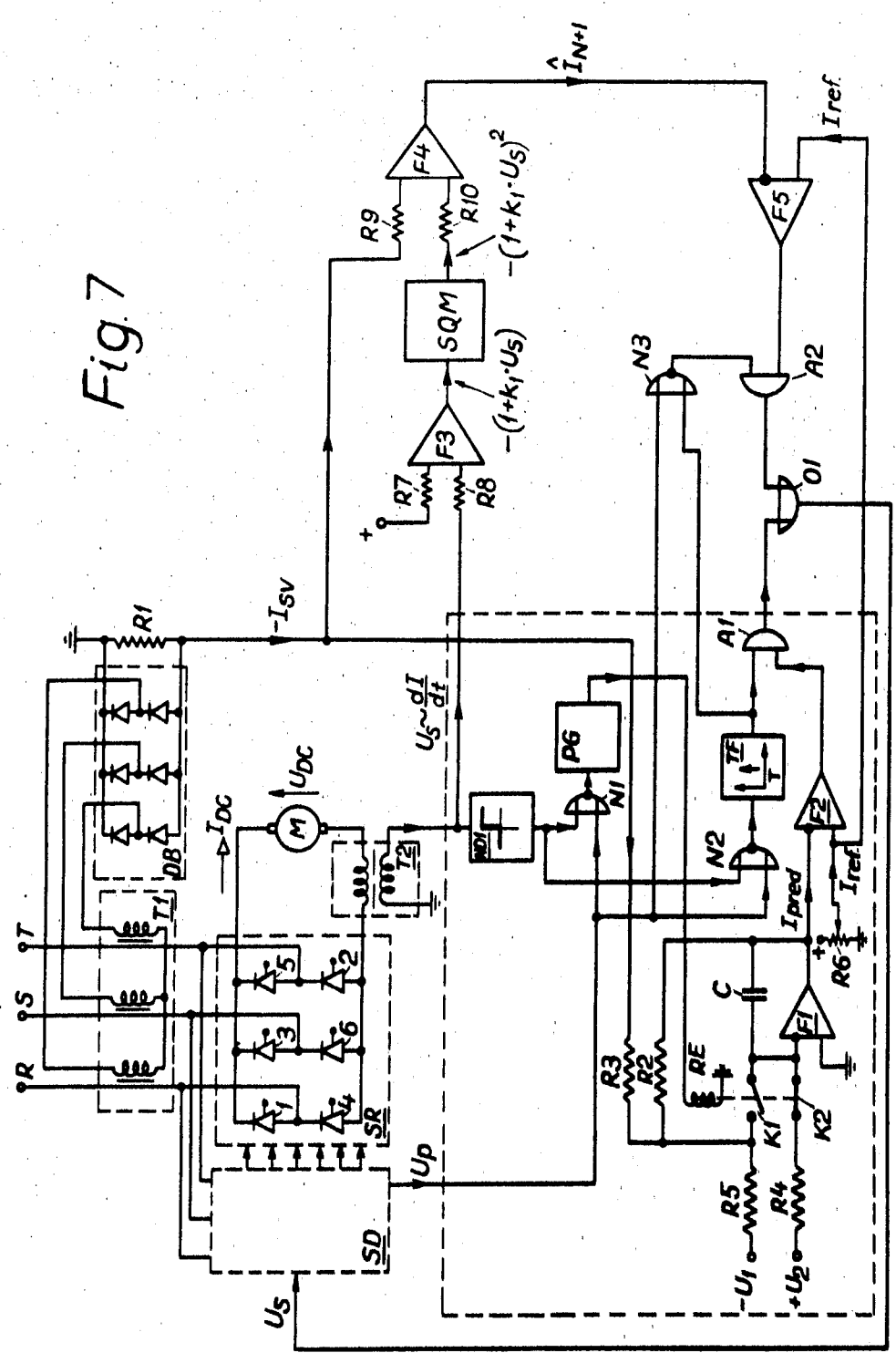

FIGS. 5, 6 and 7 shows this embodiment. FIG. 5 shows the load current and FIG. 6 the voltage as a function of time. FIG. 7 shows a connexion diagram of this embodiment.

In FIGS. 5 and 6 the load current is supposed to be $I_t$ at the commutation moment $t_1$. The direct voltage of the converter follows the curve $U_N$ before $t_1$, and $U_N$ is approximately shown as a straight line. $U_i$ is the counter electromotive force of the load object, for instance the induced counter electromotive force in a DC motor connected to and supplied by the converter. The voltage $U_N - U_i$ thus is placed across the inductive part of the load and forces an increasing current through the load, and the time derivative of the current is determined by the equation $$L \cdot dI/dt = U_N - U_i,$$

where $L$ is the inductance of the DC circuit. If no commutation had been made, the current $I$ would have followed the dashed curve. At $t_2$ $U_N - U_i$ would have become zero, and $I$ would at this moment have had its maximum value $\hat{I}_N$.

Now however a commutation is made at $t_1$, that is, the next rectifier in the commutation sequence is voltage, The voltage which during the conducting time of this rectifier is supplied to the load, is shown by the curve $U_{N+1}$ of FIG. 6. This curve is greater by the magnitude $U_o$ than $U_N$. The magnitude $U_{N+1} - U_i$ becomes zero at $t_3$, and $I$ therefore has a maximum at this moment (if no new commutation has been made before that moment). This maximum value is called $\hat{I}_{N+1}$. During the interval $t_1 - t_3$, $dI/dt$ is determined by the equation $$L \, dI/dt = U_{N+1} - U_i$$

and $I$ is obtained from this, that is $$I = I_t + \int_{t_1}^{t} \frac{dI}{dt} = I_t + \int_{t_1}^{t} \frac{U_{N+1} - U_i}{L} \, dt$$

At $t_3$, $I = \hat{I}_{N+1}$, which is obtained from $$\hat{I}_{N+1} = I_t + \int_{t_1}^{t_3} \frac{U_{N+1} - U_i}{L} \, dt = I_t + \frac{1}{L} \int_{t_1}^{t_3} (U_{N+1} - U_i) \, dt$$

In the following $t_2 - t_1$ is denoted $T_p$, that is, the commutation is made the time $T_p$ before the current peak that otherwise would have occured (at $t_2$). $t_3 - t_2$ is denoted by $T_n$ and is the commutation interval during stationary conditions $$\int_{t_1}^{t_3} (U_{N+1} - U_i) \, dt$$

is the hatched surface of FIG. 6 and its magnitude is $$\tfrac{1}{2}(U_o + (T_p/T_n) U_o)(T_p + T_n) = (U_o T_n/2)(1 + (T_p/T_n))^2.$$

From this we obtain $$\hat{I}_{N+1} = I_t + (U_o T_n / 2L)(1 + (T_p/T_n))^2$$

According to FIG. 6 we have $U_t - U_i = (T_p/T_n) \cdot U_o$ but at $t_1$ we also have $$U_t - U_i = L \, (dI/dt)$$

and therefore $T_p/T_n = (L/U_o) \cdot (dI/dt)$
$dI/dt$ may be measured by means of a transformer, whose core has an air gap, and which is connected into the load circuit. The output voltage $U_s$ of the transformer will be proportional to $dI/dt$. Because $L$ and $U_o$ are constants we obtain $$T_p/T_n = k_1 \cdot U_s$$

where $k_1$ is a constant. Further, $T_n$ will be constant for a converter which is supplied by an alternating voltage of fixed frequency. We therefore obtain at the moment $t_1$ the expression for $\hat{I}_{N+1}$, that is, $$\hat{I}_{N+1} = I_t + k_2 (1 + k_1 \cdot U_s)^2$$

From $U_s$ and $I_t$ it is therefore possible at each moment simply to compute the current at the next current peak assuming that commutation is made at that moment. This magnitude according to the invention is compared with a reference magnitude, and, when these two magnitudes are equal, a firing pulse is supplied to the rectifier which stands in turn to be fired. For the reason that the prediction is made also before the current peak of the present commutation interval, ignition may also be made before the current peak, and it is therefore possible to make large current changes from one commutation interval to the next one, that is, the system is able to give a very high speed of control.

The method which has now been described may be used as well before as after the current peak. Preferably the described method is, however, used before the current peak and the first described method after the current peak.

In FIG. 7 an embodiment of such a control system is shown. The main circuit has already been described as well as the function of the prediction system, which is used after the current peak. This system supplies by way of the AND-gate A1 a signal $U_s$ to the control pulse generator SD when a commutation is to be made. This signal is now supplied to SD by way of an OR-gate O1. In order to generate, before the current peak, the desired prediction quantity, the output signal from T2, which is proportional to $dI/dt$, is through the resistor R8 supplied to the amplifier F3. A constant positive potential is supplied to the amplifier through resistor R7. Through a suitable selection of the values of R7 and R8, the output signal of F3 may be made to correspond to $-(1+k_1 \cdot U_s)$. This quantity is supplied to a squaring circuit SQM, whose output signal will then correspond to $-(+k_1 \cdot U_s)^2$. This quantity is supplied to an amplifier F4 through the resistor R10. Through the resistor R9 a signal is supplied, which corresponds to the DC load current. R9 and R10 are so selected that the output signal of F4 will correspond to $$\hat{I}_{N+1} = I + k_2(1+k_1U_s)^2$$

This output signal is compared in the amplifier F5 with the reference quantity $I_{ref}$. The output signal from F5 will be zero, if $I_{N+1} < I_{ref}$ and one if $I_{N+1} < I_{ref}$, and is, through the AND-gate A2 and O1, supplied to SPD. A NOR-gate N3 is in the manner already described arranged to prevent a firing pulse being supplied from F5 to A2 after the current peak or during or too closely after an earlier current pulse. Possibly a certain time delay when going from 1 to 0 may be arranged between $U_p$ and N3.

We claim:

1. A current control system for a converter, said converter having an inductive load object connected to its DC terminals and comprising a plurality of controllable rectifiers and firing pulse generating means connected to the rectifiers for supplying firing pulses for firing of the rectifiers in a predetermined commutation sequence, which control system comprises
    a. current sensing means for sensing the DC load current of the converter during each time interval between two consecutive firing pulses;
    b. function generating means supplied with said sensed DC load current, for generating continuously, during at least a part of each of said intervals, on the basis of said sensed current, a prediction quantity, which at each moment corresponds to the DC load current, which is obtained during the next one of said intervals if the next firing pulse in said commutation sequence is supplied at that moment;
    c. means for generating a current reference quantity corresponding to a desired value of the load current;
    d. comparing means connected to said function generating means, to said reference quantity generating means and to said firing pulse generating means for comparing said prediction quantity with said current reference quantity and for causing said firing pulse generating means to supply the next firing pulse in said commutating sequence when said predicted quantity and said current reference quantity are equal.

2. Control system according to claim 1, which comprises maximum current indicating means for supplying to said function generating means information about the time when the DC load current during the interval has its maximum value.

3. Control system according to claim 2, in which said maximum current indicating means comprises a transformer having a primary winding connected into the DC load current circuit and generating a secondary voltage, the passage of the secondary voltage through zero constituting said information.

4. Control system according to claim 1, in which said quantity generated by the function generating means corresponds to the peak value of the DC load current during the following commutation interval.

5. Control system according to claim 4, in which said quantity corresponds to the peak value of the direct current under the present interval at a moment which is half the average length of a commutation interval later than the moment of the peak value of the direct current under the present interval.

6. Control system according to claim 4, in which said quantity is a linear function of time.

7. Control system according to claim 6, in which said quantity has a time derivative equal to $-8 \cdot \Delta \hat{I}/T_n$, where $\Delta \hat{I}$ is the peak-to-peak value of the DC load current pulsations during stationary conditions, and where $T_n$ is the average length of a commutation interval.

8. Control system according to claim 1, in which the system has means to influence said firing pulse generating means for supplying a firing pulse only after the moment of occurrence of the peak value of the DC load current during the present commutation interval.

9. Control system according to claim 7, in which said quantity corresponds to $I + 4 \Delta \hat{I}$ during a time before the occurrence of the peak value of the load current, where $I$ is the momentary value of the DC load current.

10. Control system according to claim 1, in which said function generating means generates, at least during part of each commutation interval, a first magnitude which at each moment corresponds to the time-voltage intergral, which, if a commutation had been made at that moment, would have been supplied to the inductance of the DC circuit during the time interval from said moment to the next following load current peak, and includes a first adding means supplied with said first magnitude and, supplied from said current sensing means, with a quantity corresponding to the momentary value of the load current to generate an output quantity corresponding to the sum of these quantities, and in which said output quantity is supplied to said comparing means for comparison with said reference quantity.

11. Control system according to claim 10, in which said function generating means comprises time determining means for generating, at each moment, a second quantity corresponding to the time to the load current peak of the next following commutation interval and computation means supplied with said second quantity to generate said first quantity in dependence upon said second quantity.

12. Control system according to claim 11, in which said time determining means comprise first means for generating a third quantity, which, at each moment, corresponds to the time interval between said moment and the moment of occurrence of the load current peak of the present commutation interval, said time determining means also comprising second adding means for adding to said third quantity a fourth quantity corresponding to the time interval between two load current maxima for generating said second quantity.

13. Control system according to claim 12, in which said first means comprises current derivative sensing means for generating a quantity which corresponds to the time derivative of the load current and which constitutes said third quantity.

14. Control system according to claim 13, in which said current derivative sensing means comprises a transformer having a primary winding which is connected into the DC load current circuit and the secondary voltage of which is supplied to said second adding means.

15. Control system according to claim 14, in which said transformer has a core which is provided with an air gap.

16. Control system according to claim 11, in which said computing means comprises squaring means supplied with said second quantity and generating an output signal corresponding to the square of said second quantity, said output signal constituting said first quantity.

* * * * *